Jan. 13, 1931.  S. WILLIAMSON  1,789,091
APPARATUS FOR JOINING WIRES
Filed Aug. 19, 1929  2 Sheets-Sheet 2

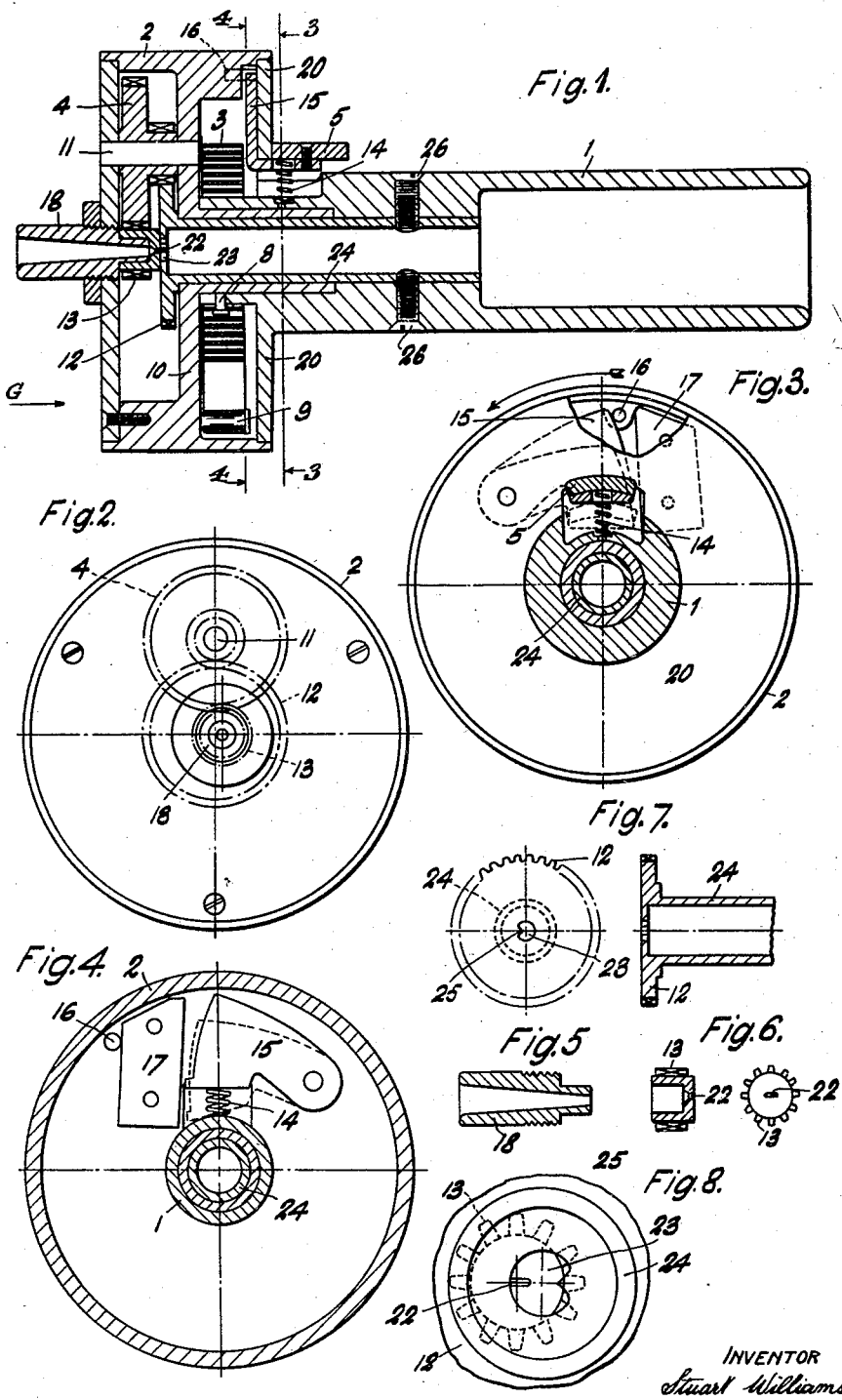

INVENTOR
Stuart Williamson
Attorney.

Patented Jan. 13, 1931

1,789,091

UNITED STATES PATENT OFFICE

STUART WILLIAMSON, OF LONDON, ENGLAND, ASSIGNOR OF ONE-HALF TO COLIN MARTIN WILLIAMSON, OF LONDON, ENGLAND

APPARATUS FOR JOINING WIRES

Applicatoin filed August 19, 1929, Serial No. 387,015, and in Great Britain August 20, 1928.

The present invention relates to apparatus designed for the purpose of joining wires by twisting them together. Such a tool can be employed in many processes and is particularly useful in electrical work for example such a tool can be employed very conveniently for joining together the wires of a multiple stranded cable or under other conditions where it is necessary to connect a number of pairs of wires.

The apparatus preferably takes the form of a tool that can be conveniently held in the hands and manipulated for joining wires in confined spaces, for example in junction boxes, or in inaccessible corners.

Briefly stated the invention comprises the use of a coiled spring adapted to be initially wound up by hand and to be released by a trigger in order to effect the twisting operation. This spring is arranged to revolve either directly or through gearing a member in engagement with the wires to be twisted. A cutter may be provided for severing the extremities of the twisted wires at the completion of the twisting operation.

My invention is shown by way of example in the accompanying drawings, in which—

Figure 1 shows a longitudinal section of the apparatus in the form of a tool conveniently held in the hands and manipulated for joining wires in tight places.

Figure 2 shows a view of the tool shown in Figure 1 looking in the direction of the arrow G.

Figure 3 shows a section on the line 3—3 of Figure 1.

Figure 4 shows a section on the line 4—4 of Figure 1 (looking in the opposite direction to the view shown in Figure 3).

Figure 5 shows a detail sectional view of the wire nozzle.

Figure 6 shows detail views of the twisting pinion.

Figure 7 shows detail views of the cutter pinion.

Figure 8 shows a detail assembled view on an enlarged scale illustrating the position of the cutter pinion shown in Figure 7 in relation to the twisting pinion shown in Figure 6.

Figure 9:
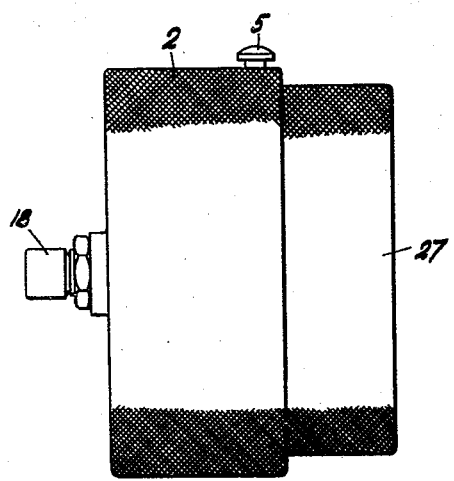
Figure 9 shows a side view of an alternative form of the tool.

Referring now to the drawings, the tool illustrated in Figures 1 to 4, is provided with a knurled handle 1 of convenient size for the hand, on one end of which is rotatably mounted a cylindrical box 2 containing a coiled spring 3 connected at one end by the pin 8 to the handle 1 and at the other end by the pin 9 to the inner wall 10 of said box 2. This wall 10 carries a spindle 11 on which is mounted a double pinion wheel 4 in gear with the stationary cutter pinion 12 and the twisting pinion 13 hereinafter described. As will be readily understood the spring 3 is wound up in the opposite direction by rotating box 2 by hand and by the relative rotation of these two members the box member 2 is rotated relatively to the handle portion 1 under the influence of the said spring when the latter is released by a trigger 15. This trigger 15 is pivotally mounted on the handle flange 20 and is controlled by a spring 14 arranged in a recess in said handle beneath the operating member 5 of the trigger which extends through an opening in said handle flange over the handle as shown in Figure 1. The spring 14 normally holds the trigger 15 in the path of a stop 16 projecting from the rotatable box 2. When the coiled spring 3 is wound up these parts are in the position shown in Figure 3 with the stop 16 in engagement with the trigger 15. When the operating member 5 is pressed down against the influence of the spring 14 the box 2 rotates in the direction of the arrow shown in Figure 3 until the said stop 16 comes into engagement with a stop plate 17 mounted on the handle flange in close proximity to said trigger as shown in Figure 4. The revolution of the box 2 under the influence of the coiled spring 3 carries with it the double pinion wheel 4 around the stationary cutter pinion 12 with which it is in engagement as shown in Figure 1. The rotation thus given to said pinion 4 is transmitted to the twisting pinion 13 mounted on the inner end of the wire nozzle 18 carried on the front wall of the box 2. This nozzle 18 is set off the central axis of the tool so that the rotation of the pinion is not concentric with the cutter pinion 12. The pinion 13 is provided with a central elongated opening 22 designed to receive the wires which have been passed through the nozzle. It will be easily understood that the rotation given to the pinion 13 will twist the wires therein together. The twisted ends of the wires may project through the opening 23 in the stationary cutter pinion 12 and owing to the slight eccentric movement given to these twisted ends by the twisting pinion 13 these ends are severed by the knife point 25 projecting into the opening 23 at the completion of the twisting operation. As shown in Figure 1 the pinion 12 is suitably formed integral with a sleeve 24 which extends into the handle 1 and is attached thereto by the set screw 26. This sleeve forms a bearing for the revoluble box 2 and the connection between said box and the handle.

Figure 10:
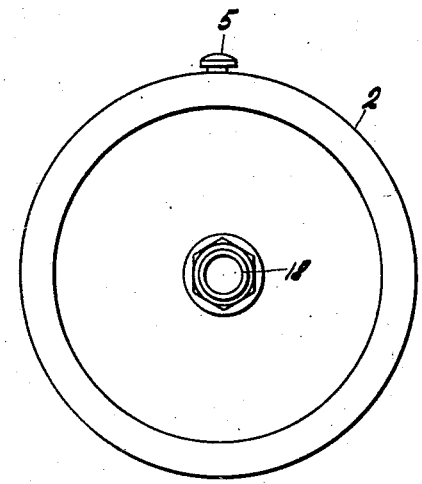
Figure 10 shows an end view of Figure 9.

In Figures 9 and 10 I show an alternative form of the tool in which a short knurled cylindrical box 27 is substituted for the relatively long handle 1 of the tool shown in Figure 1. The trigger operating member 5 in this alternative form of tool is preferably mounted on the periphery of the cylindrical box 2 and not on the handle 1 as in the first described tool. The internal members of the alternative form of tool are identical in form and position with these members in the said long handle tool.

The drawings show the preferred embodiment of my invention in a portable form. It is apparent however that the invention may be applied in a variety of forms and other types of motors than the spring shown in the drawings may be used. The claims are intended to include a full range of equivalents.

What I claim is:—

1. A tool for joining wires by twisting them together comprising a handle, a holder revolubly mounted on said handle, a member engaging the wires to be joined, a spring within said holder adapted to rotate said member, said spring being wound by hand and means for releasing said spring to effect said twisting.

2. A tool for joining wires by twisting them together comprising a handle, a holder revolubly mounted on said handle, a member engaging the wires to be joined, a spring, gearing connecting said spring with said member to rotate said member, said spring being wound by hand and means for releasing said spring to effect said twisting.

3. A tool for joining wires by twisting them together comprising a handle, a holder revolubly mounted on said handle, a member having a pinion formed thereon engaging the wires to be joined, a stationary gear mounted on said handle and gearing mounted on said revoluble holder connecting said pinion with said sthationary gear.

4. A tool for joining wires by twisting them together comprising a handle, a holder revolubly mounted on said handle, a nozzle for receiving the wires to be joined, a pinion having means for twisting the wires mounted on said nozzle, a stationary gear mounted on said handle and means mounted on said revoluble holder operatively connecting said pinion with said stationary gear.

5. A tool for joining wires by twisting them together comprising a handle, a holder revolubly mounted on said handle, a member engaging the wires to be joined, a spring mounted on said holder adapted to rotate said member, a cutter for severing the extremities of the twisted wires and means for releasing said spring to effect said twisting and cutting operations.

6. A tool for joining wires by twisting them together comprising a handle, a holder revolubly mounted on said handle, a member engaging the wires to be joined, a stationary gear mounted on said handle having a hollow stem with a cutter projecting into said hollow stem, means mounted on said holder operatively connecting said stationary gear with said member for twisting said wires and for bringing the extremities of said wires into engagement with said cutter.

7. A tool for joining wires by twisting them together comprising a handle, a holder revolubly mounted on said handle, a member having an aperture through which the wires to be joined are placed, a hollow stem in said handle with a projecting cutter arranged to receive the projecting ends of the wires from said member, said member being eccentrically mounted with relation to said hollow stem and means for rotating said member for twisting said wires and for bringing the projecting ends of said wires into engagement with said cutter.

8. A tool for joining wires by twisting them together comprising a handle, a holder revolubly mounted on said handle, a member having an aperture through which the wires to be joined are placed, means operatively connecting said holder with said member whereby said member is rotated to twist the wires and a motor for operating said holder.

9. A tool for joining wires by twisting them together comprising a handle with a hollow stem, a holder axially mounted for rotation on said handle, a rotatable member having a slot in axial alignment with the hollow stem of said handle for receiving the wires to be twisted, means operatively connecting said holder with said member for rotating said member, a motor for rotating said holder and means for controlling said motor.

10. A tool for cutting wires comprising a handle with a hollow stem having a transverse cutter projecting therein, a rotatable member having a slot for receiving the wires eccentrically mounted relative to the axis of said handle and means for rotating said member to bring the wires into engagement with said cutter.

In testimony whereof I have signed my name to this specification.

STUART WILLIAMSON.